(No Model.)
P. GENDRON.
CRANK SHAFT AND BEARING FOR BICYCLES.
No. 503,790. Patented Aug. 22, 1893.
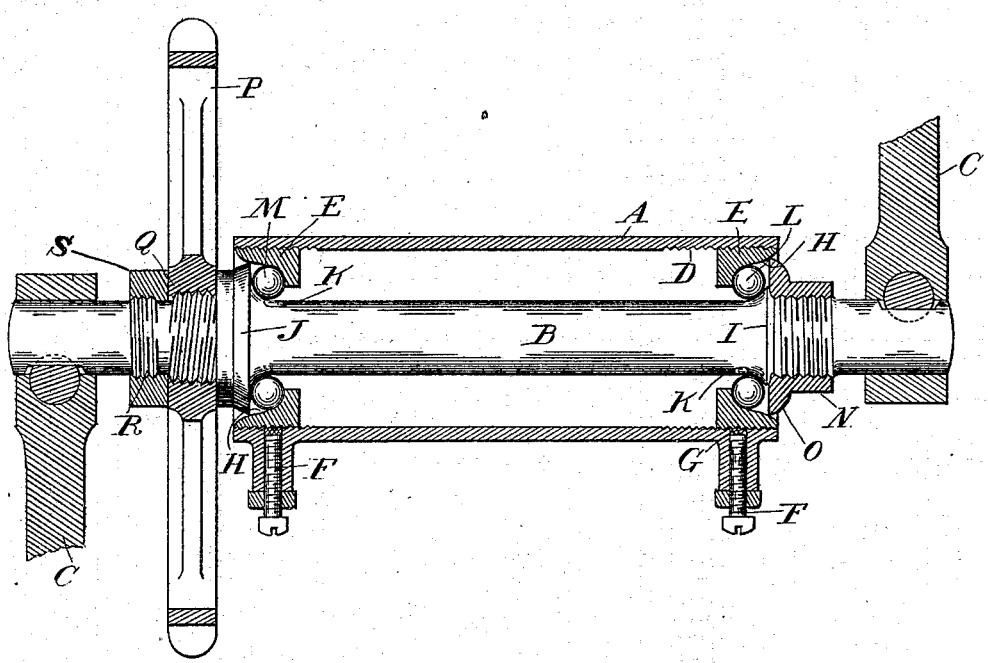
Witnesses
J. L. Hobbie
M. B. Dougherty
Inventor
Peter Gendron
By Thos. H. Sprague & Son,
Atty's.

UNITED STATES PATENT OFFICE.

PETER GENDRON, OF TOLEDO, OHIO.

CRANK-SHAFT AND BEARING FOR BICYCLES.

SPECIFICATION forming part of Letters Patent No. 503,790, dated August 22, 1893.

Application filed March 16, 1893. Serial No. 466,192. (No model.)

*To all whom it may concern:*

Be it known that I, PETER GENDRON, a citizen of the United States, residing at Toledo, in the county of Lucas and State of Ohio, have invented certain new and useful Improvements in Crank-Shafts and Bearings for Bicycles, of which the following is a specification, reference being had therein to the accompanying drawing.

The invention consists in the peculiar construction, arrangement and combination of the various parts.

The drawing represents a vertical central section through a crank shaft and bearing embodying my invention.

A is a tube in the frame secured thereto in any suitable manner, and in proper position to receive the crank shaft B, which has suitable cranks C secured at its ends in the usual manner. This tube is provided with interior screw threaded portions D at each end, with which the race rings E engage.

F are set screws engaging through the tube and adapted to hold the rings in their adjusted position. To prevent damage to the threads of the rings, I interpose a block G between the end of the set screw and the ring. This block is preferably a piece of leather, felt, lead or other soft material, which will conform to the shape of the threads on the ring, and give sufficient friction when the set screw is applied to hold the ring firmly in place without possibility of damaging it. These rings have ball races H on their outer faces.

The shaft is provided with the collars I and J, having ball races K formed on their inner faces. The collar I is preferably smaller than the inner bore of the rings E. To assemble the parts, the ring E is screwed quite a way into the tube, the shaft is placed in position in the tube, and the balls L are filled into the races E and K, at the small end of the shaft. The balls M are then placed in the races at the other end, and the ring E screwed out until the races engage tightly upon the balls. The nut N is then screwed upon the shaft, and its flange O closes up the space between the shaft and ring E, to make as nearly as possible a dust proof bearing.

At the end upon which the sprocket wheel P is to be secured, the shaft is provided with an enlargement Q, which is provided with a screw thread, and an opposite screw thread R upon the shaft beside the enlargement. The sprocket wheel is first screwed on the enlargement, its bore being sufficiently large to pass over the thread R, and then the nut S is screwed up against the hub of the wheel, and prevents any possibility of its becoming loose.

What I claim as my invention is—

1. In a shaft bearing, the combination of a tube interiorly screw threaded at the ends, race rings engaging said threaded portions having ball races on their outer ends, a shaft having collars with ball races on their inner faces, one collar being of a diameter less than the inner bore of the rings and the balls in the races, substantially as described.

2. In a shaft bearing, the combination of a tube interiorly threaded at the ends, race rings engaging in said threaded portions having ball races on their outer ends, a shaft having collars near the ends, ball races on the inner faces of the collars, one collar being of a diameter less than the inner bore of the rings, the balls in the races, and the nut N having flange O, substantially as and for the purpose described.

3. In a shaft bearing, the combination of the screw threaded adjustable rings, of a set screw for holding them in their adjusted position, and a soft block interposed between the end of the set screw and the screw on the rings, substantially as described.

In testimony whereof I affix my signature in presence of two witnesses.

PETER GENDRON.

Witnesses:
M. B. O'DOGHERTY,
N. L. LINDOP.